(12) United States Patent
Scott

(10) Patent No.: US 6,509,561 B1
(45) Date of Patent: Jan. 21, 2003

(54) PROTECTIVE COVER ASSEMBLY FOR GARAGE DOOR SENSORS

(76) Inventor: John Perry Scott, 4238 Perkins Rd., Youngsville, LA (US) 70592

( * ) Notice: Subject to any disclaimer, the term of this patent is extended or adjusted under 35 U.S.C. 154(b) by 20 days.

(21) Appl. No.: 09/759,078

(22) Filed: Jan. 12, 2001

(51) Int. Cl.[7] .................................................. H01I 5/02
(52) U.S. Cl. ........................................ 250/239; 49/26
(58) Field of Search ................................. 250/221, 239; 340/555, 556; 49/26

(56) References Cited

U.S. PATENT DOCUMENTS

| | | |
|---|---|---|
| 3,822,384 A * | 7/1974 | Chapron et al. ............ 250/239 |
| 4,102,471 A | 7/1978 | Lore et al. |
| 4,991,949 A | 2/1991 | Moorehead |
| D346,587 S | 5/1994 | Herman et al. |
| 5,811,799 A | 9/1998 | Wu |
| 5,934,019 A | 8/1999 | Rotharmel et al. |
| 5,937,578 A * | 8/1999 | Dolan et al. .................... 49/25 |
| 6,157,023 A * | 12/2000 | Wenner ....................... 250/221 |

* cited by examiner

*Primary Examiner*—Robert Kim
*Assistant Examiner*—Hoon K. Song

(57) ABSTRACT

A protective cover assembly for garage door sensors for protecting the garage door sensors from being damaged or impacted. The protective cover assembly for garage door sensors includes a first shroud member being adapted to extend about a garage door sensor; and also includes a second shroud member being adapted to extend about a cooperating garage door sensor.

6 Claims, 2 Drawing Sheets

PROTECTIVE COVER ASSEMBLY FOR GARAGE DOOR SENSORS

BACKGROUND OF THE INVENTION

1. Field of the Invention

The present invention relates to a photo cell guard assembly and more particularly pertains to a new protective cover assembly for garage door sensors for protecting the garage door sensors from being damaged or impacted.

2. Description of the Prior Art

The use of a photo cell guard assembly is known in the prior art. More specifically, a photo cell guard assembly heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,811,799; 4,991,949; U.S. Pat. No. Des. 346.587; U.S. Pat. Nos. 4,102,471; 5,934,019; and 5,937,578.

While these devices fulfill their respective, particular objectives and requirements, the aforementioned patents do not disclose a new protective cover assembly for garage door sensors. The inventive device includes a first shroud member being adapted to extend about a garage door sensor; and also includes a second shroud member being adapted to extend about a cooperating garage door sensor.

In these respects, the protective cover assembly for garage door sensors according to the present invention substantially departs from the conventional concepts and designs of the prior art, and in so doing provides an apparatus primarily developed for the purpose of protecting the garage door sensors from being damaged or impacted.

SUMMARY OF THE INVENTION

In view of the foregoing disadvantages inherent in the known types of photo cell guard assembly now present in the prior art, the present invention provides a new protective cover assembly for garage door sensors construction wherein the same can be utilized for protecting the garage door sensors from being damaged or impacted.

The general purpose of the present invention, which will be described subsequently in greater detail, is to provide a new protective cover assembly for garage door sensors which has many of the advantages of the photo cell guard assembly mentioned heretofore and many novel features that result in a new protective cover assembly for garage door sensors which is not anticipated, rendered obvious, suggested, or even implied by any of the prior art photo cell guard assembly, either alone or in any combination thereof.

To attain this, the present invention generally comprises a first shroud member being adapted to extend about a garage door sensor, and also includes a second shroud member being adapted to extend about a cooperating garage door sensor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new protective cover assembly for garage door sensors which has many of the advantages of the photo cell guard assembly mentioned heretofore and many novel features that result in a new protective cover assembly for garage door sensors which is not anticipated rendered obvious, suggested, or even implied by any of the prior art photo cell guard assembly, either alone or in any combination thereof.

It is another object of the present invention to provide a new protective cover assembly for garage door sensors which may be easily and efficiently manufactured and marketed.

It is a further object of the present invention to provide a new protective cover assembly for garage door sensors which is of a durable and reliable construction.

An even further object of the present invention is to provide a new protective cover assembly for garage door sensors which is susceptible of a low cost of manufacture with regard to both materials and labor, and which accordingly is then susceptible of low prices of sale to the consuming public, thereby making such protective cover assembly for garage door sensors economically available to the buying public.

Still yet another object of the present invention is to provide a new protective cover assembly for garage door sensors which provides in the apparatuses and methods of the prior art some of the advantages thereof, while simultaneously overcoming some of the disadvantages normally associated therewith.

Still another object of the present invention is to provide a new protective cover assembly for garage door sensors for protecting the garage door sensors from being damaged or impacted.

Yet another object of the present invention is to provide a new protective cover assembly for garage door sensors which includes a first shroud member being adapted to extend about a garage door sensor; and also includes a second shroud member being adapted to extend about a cooperating garage door sensor.

Still yet another object of the present invention is to provide a new protective cover assembly for garage door sensors that is easy and convenient to attach about the garage door sensors.

Even still another object of the present invention is to provide a new protective cover assembly for garage door sensors that saves the user from expensive repairs to expensive garage door sensors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
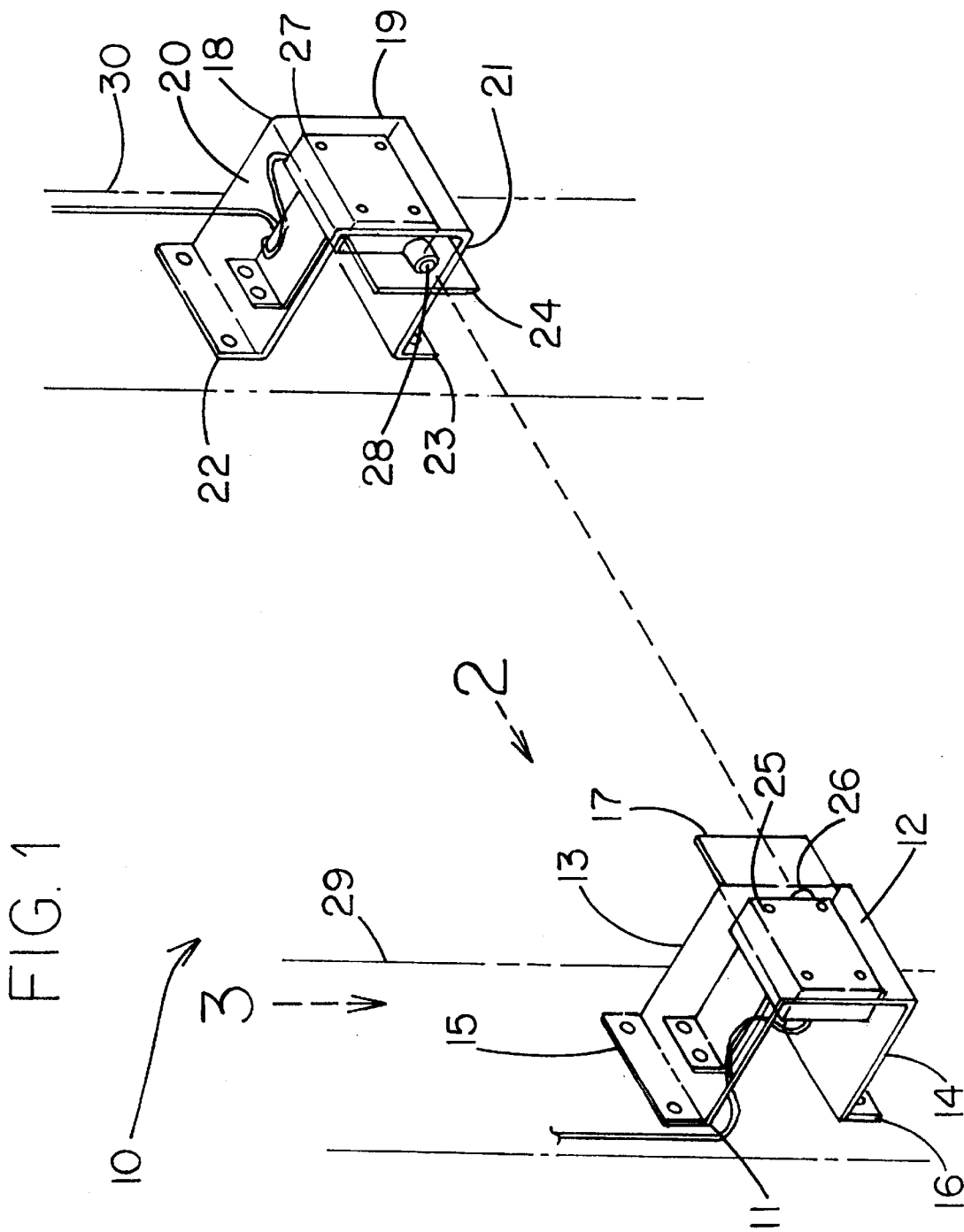
FIG. 1 is a perspective view of a new protective cover assembly for garage door sensors according to the present invention and shown in use.
Figure 2:
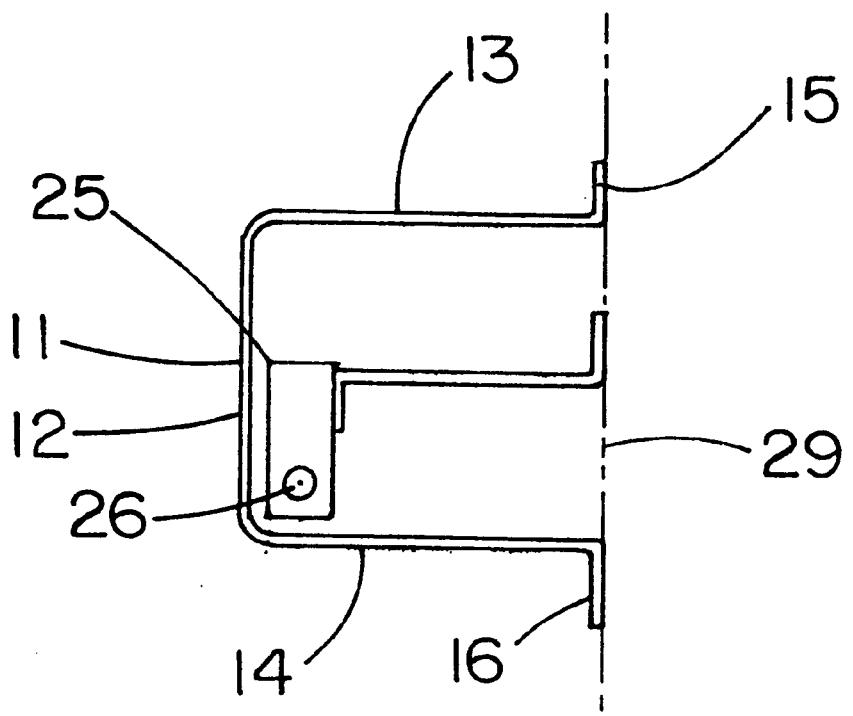
FIG. 2 is a side view of the present invention.
Figure 3:
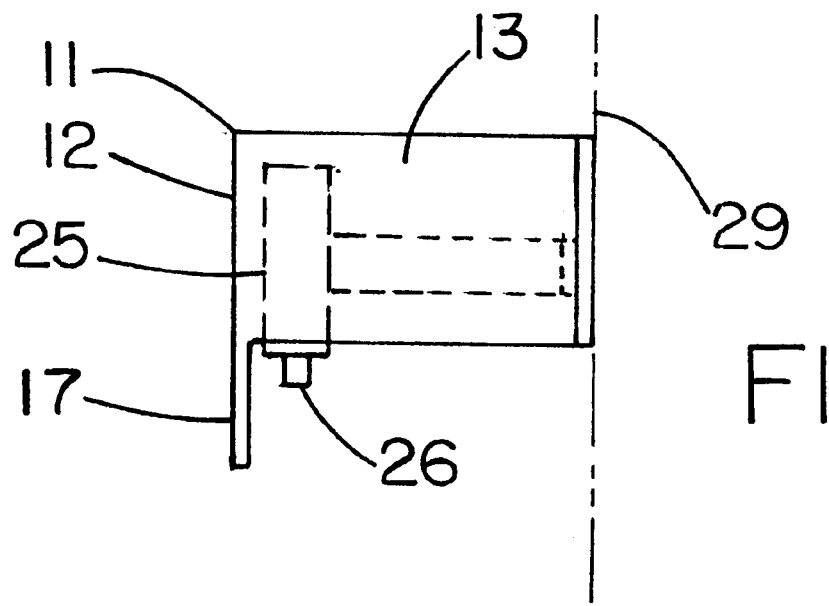
FIG. 3 is a top plan view of the present invention.

With reference now to the drawings, and in particular to FIGS. 1 through 3 thereof, a new protective cover assembly for garage door sensors embodying the principles and concepts of the present invention and generally designated by the reference numeral 10 will be described.

As best illustrated in FIGS. 1 through 3, the protective cover assembly for garage door sensors 10 generally comprises a first shroud member 11 being adapted to extend about a garage door sensor 25, and also comprises a second shroud member 18 being adapted to extend about a cooperating garage door sensor 27. Each of the first and second shroud members 11,18 includes a plate-like main portion 12,19, and also includes a pair of plate-like end portions 13,14,20,21 being angled relative to the plate-like main portion 12,19 and being conventionally attached to ends of the plate-like main portion 12,19 and being extended generally parallel to one another, and further includes flange portions 15,16,22,23 being securely and conventionally attached at ends of the plate-like end portions 13,14,20,21 and being angled relative to the plate-like end portions 13,14,20,21 and being adapted to be fastened to a structure 29,30 to which the respective garage door sensor 25,27 is mounted. The plate-like main portions 12,19 and the plate-like end portions 13,14,20,21 form corners which are rounded. The plate-like end portions 13,14,20,21 of each of the first and second shroud members 11,18 are adapted to extend outwardly generally perpendicular to the respective structure 29,30, and the plate-like main portions 12,19 of each of the first and second shroud members 11,18 is adapted to be spaced from and disposed generally parallel to the respective structure 29,30 and is adapted to cover a side of the respective garage door sensor 25,27. Each of the first and second shroud members 11,18 further includes a plate-like extension 17,24 being securely and conventionally attached along a longitudinal side edge of the plate-like main portion 12,19 to essentially protect a lens 26,28 of a respective garage door sensor 25,27. The first and second shroud members 11,19 are made of a transparent plastic material with each of the first and second shroud members 11,19 having a length of approximately 7 inches, a height of approximately 6 inches, and a width of approximately 4 inches.

In use, the user secures the first and second shroud members over the top, bottom and exposed side of the garage door sensors 25,27 so that the user doesn't hit the garage door sensors 25,27 with a vehicle or with other objects which could either damage the garage door sensors 25,27 or knock the garage door sensors 25,27 out of alignment.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A protective cover assembly for garage door sensors emitting a detection beam therebetween, said assembly comprising:

a first shroud member being adapted to extend about a garage door sensor;

a second shroud member being adapted to extend about a cooperating garage door sensor; and wherein each of said shroud members comprises a generally U-shaped plate with at least one open side such that when each of said shroud members is positioned about one of the door sensors, the detection beam may pass between the sensors without interruption by said shroud members.

2. A protective cover assembly for garage door sensors as described in claim 1, wherein each of said first and second shroud members includes a main portion and a pair of end portions being angled relative to said main portion, each of said end portions being attached to first ends of said main portion and extending generally parallel to one another;

each of said shroud members having a pair of flange portions being securely attached at second ends of said end portions and being angled relative to said end portions, each of said flange portions being adapted to be fastened to a structure to which the respective garage door sensor is mounted; and said main portions and said end portions forming corners which are rounded.

3. A protective cover assembly for garage door sensors as described in claim 2, wherein said end portions of each of said first and second shroud members are adapted to extend outwardly generally perpendicular to the respective structure, and said main portion of each of said first and second shroud members is adapted to be spaced from and disposed generally parallel to the respective structure and is adapted to cover a side of a respective garage door sensor.

4. A protective cover assembly for garage door sensors as described in claim 3, wherein each of said first and second shroud member further includes an extension being securely attached along a longitudinal side edge of said main portion to essentially protect a lens of a respective garage door sensor.

5. A protective cover assembly for garage door sensors as described in claim 4, wherein said first and second shroud members are made of a transparent plastic material.

6. A system comprising:
   a garage with a garage door opening;
   a pair of garage door sensors mounted at opposite locations of said garage door opening, said sensors passing a detection beam therebetween; and
   a protective cover assembly for said garage door sensors comprising:
      a first shroud member extending about a first said garage door sensor; and
      a second shroud member extending about a second said garage door sensor;
   wherein each of said shroud members comprises a generally U-shaped plate with at least one open side such that when each of said shroud members is positioned about one of the door sensors, the detection beam may pass between the sensors without interruption by said shroud members;
   each of said first and second shroud members including a main portion and a pair of end portions being angled relative to said main portion, each of said end portions being attached to first ends of said main portion and extending generally parallel to one another, each of said shroud members having a pair of flange portions being securely attached at second ends of said end portions and being angled relative to said end portions, each of said flange portions being adapted to be fastened to a structure to which the respective garage door sensor is mounted;
   said main portions and said end portions forming corners which are rounded;
   said end portions of each of said first and second shroud members being adapted to extend outwardly generally perpendicular to the respective structure;
   said main portion of each of said first and second shroud members being adapted to be spaced from and disposed generally parallel to the respective structure and being adapted to cover a side of a respective garage door sensor;
   each of said first and second shroud member further including an extension being securely attached along a longitudinal side edge of said main portion to essentially protect a lens of a respective garage door sensor; and
   said first and second shroud members being made of a transparent plastic material and having a length of approximately 7 inches, a height of approximately 6 inches, and a width of approximately 4 inches.

* * * * *